United States Patent [19]
Fink

[11] Patent Number: 6,065,842
[45] Date of Patent: May 23, 2000

[54] HEAT MAPS FOR CONTROLLING DEFORMATIONS IN OPTICAL COMPONENTS

[75] Inventor: David Fink, Los Angeles, Calif.

[73] Assignee: Raytheon Company, Lexington, Mass.

[21] Appl. No.: 09/083,551

[22] Filed: May 22, 1998

[51] Int. Cl.[7] .............................. G02B 7/185; G02B 7/192
[52] U.S. Cl. ............................ 359/846; 374/121; 374/124; 374/130; 374/141; 392/419
[58] Field of Search ............................ 374/4, 57, 5, 121, 374/124, 141, 130, 131; 392/419; 359/554, 555, 557, 845, 846, 849, 288, 289

[56] References Cited

U.S. PATENT DOCUMENTS

| | | | |
|---|---|---|---|
| 4,468,136 | 8/1984 | Murphy et al. | 374/45 |
| 4,618,223 | 10/1986 | Fried | 359/845 |
| 4,747,698 | 5/1988 | Wickramasinghe et al. | 374/6 |
| 5,048,051 | 9/1991 | Zayhowski | 372/34 |
| 5,073,831 | 12/1991 | Flint | 359/845 |
| 5,294,198 | 3/1994 | Schlagheck | 374/4 |
| 5,362,956 | 11/1994 | Anafi et al. | 250/201.9 |
| 5,751,750 | 5/1998 | Friede et al. | 372/34 |
| 5,775,806 | 7/1998 | Allred | 374/124 |

FOREIGN PATENT DOCUMENTS 5-066297   3/1993   Japan .

*Primary Examiner*—Margaret Burke
*Attorney, Agent, or Firm*—Colin M. Raufer; Leonard A. Alkov; Glenn H. Lenzen, Jr.

[57] ABSTRACT

A system (80) for controlling deformations of optical components adapted for use with laser system aperture sharing elements (16) and deformable mirrors. The inventive system (80) includes a control loop (12, 40, 24, 20, 46, 28, 74, 78, 60, 34) for determining a desired temperature pattern. The control loop (12, 40, 24, 46, 28, 74, 78, 60, 34) provides a control signal (45) corresponding to the desired temperature pattern to a heat map applicator (18, 46, 47, 59, 60). The heat map applicator (18, 46, 47, 59, 60) applies the desired temperature pattern to the optical component (16) in response to the control signal and the optical component (16) is selectively deformed in response thereto. In a specific embodiment, the control loop (12, 40, 24, 20, 46, 28, 74, 78, 60, 34) is a closed loop control system that includes an interferometer (74). The interferometer (74) provides a first shape of the optical component (16) to a comparator circuit (20) that compares the first shape to a desired shape corresponding to the desired temperature pattern for determining the control signal. An alternative closed loop control system (12, 40, 24, 20, 46, 28, 74, 78, 60, 34) includes an infrared energy detector (12) that determines a current temperature pattern and generates the control signal in response thereto for converting the current temperature pattern to the desired temperature pattern. The heat map applicator (18, 46, 47, 59, 60) provides an electromagnetic beam (50, 52) that is swept across the optical component (16) to impart the desired temperature pattern on the optical component (16). In another illustrative embodiment, the control loop is an open loop control system that includes a complimentary electromagnetic energy beam that is swept over the optical component to form a heat pattern complimentary to the temperature pattern imparted to the optical component by a high power laser beam such that the total heat deposited on the optical component is uniform.

19 Claims, 6 Drawing Sheets

HEAT MAPS FOR CONTROLLING DEFORMATIONS IN OPTICAL COMPONENTS

BACKGROUND OF THE INVENTION

1. Field of Invention

This invention relates to systems for controlling deformations in optical components. Specifically, the present invention relates to systems for controlling temperature related distortions of optical components in high power laser systems.

2. Description of the Related Art

High power laser systems are used in a variety of demanding applications ranging from target aiming systems to precision cutting devices. Such applications require systems with very precise optical components and accurate aiming capability.

High power laser systems typically include several optical components such as deformable mirrors and beam splitters. High energy laser beams often have uneven beam intensity profiles that result in uneven heating of laser system optical components. The uneven heating tends to distort optical components, changing the refractive and reflective properties of the components, decreasing laser system performance.

Typically, as the diameter of a laser beam decreases, beam irradiance increases. Increases in beam irradiance magnify distortions caused by uneven beam intensity profiles. Resulting component distortions often limit beneficial size reductions of high power laser systems and place costly design constraints on the systems.

Temperature related distortions are particularly problematic in the aperture sharing element of a laser system. The aperture sharing element is a beam sharing device that facilitates use of an optical system for both transmit and receive functions. Signals received through the aperture sharing element are used to aim the laser system. Uncompensated aperture sharing element distortions reduce the aiming and focusing capability of the laser system.

To reduce distortions of the aperture sharing element, high quality materials are typically used. The materials include low-absorption, optically efficient surface coatings, gratings, and aperture sharing element substrates. These materials are expensive and typically do not eliminate component deformations.

To correct any remaining aperture sharing element distortions, a variety of beam compensation systems are used. The systems typically include distortion sensing systems such as wavefront sensors, electronic control loops, and extra optical components to compensate for the distortions. Additional complicated circuitry and optical components such as deformable mirrors make these systems expensive and bulky.

These beam compensation systems typically include deformable mirrors. Deformable mirrors are placed in the beam path and selectively deformed to correct the beam for undesirable distortions. The mirrors include arrays of electromechanical actuators. Large physical spacings required for the actuators result in bulky deformable mirrors. Also, driving the actuators requires high voltages and expensive amplifiers. In addition, the mirrors cannot quickly control very small mirror movements. This limits the overall effectiveness of the deformable mirrors.

Wavefront sensors and deformable mirrors are typically used to sense and correct source laser optical distortions, beam train distortions, and atmospheric distortions. To correct for aperature sharing element distortions, additional wavefront sensors and deformable mirrors are typically required.

Hence, a need exists in the art for a cost-effective, space-efficient system for controlling deformations in optical components of high power laser systems. There is a further need for a system that can rapidly control small deformations in deformable mirrors.

SUMMARY OF THE INVENTION

The need in the art is addressed by the system for controlling deformations in optical components of the present invention. In the illustrative embodiment, the inventive system is adapted for use with aperture sharing elements and deformable mirrors and includes a control loop for determining a desired heat pattern that corresponds to a desired component shape. The control loop provides a control signal corresponding to the desired heat pattern to a heat map applicator. The heat pattern applicator applies the heat pattern to the optical component in response to the control signal. The optical component is deformed into the desired shape by the heat pattern. In this way, undesirable temperature related optical distortions may be eliminated, as the shape and temperature of the optical component may be actively controlled.

In a specific embodiment, the control loop is a closed loop control system that includes an interferometer. The interferometer provides a first shape of the optical component to a comparator circuit that compares the first shape to the desired shape for determining the control signal. The closed loop control system uses the control signal to selectively apply map heat map corresponding to the heat pattern to the optical component. The heat map applicator is an electromagnetic energy beam generator that provides an electromagnetic beam that is swept across the optical component by the control system in a pattern corresponding to the heat pattern.

In another illustrative embodiment, the control loop is an open loop control system that includes an electromagnetic energy beam for applying a heat pattern complimentary to that of an incident high power laser beam irradiance such that the total heat deposited on the optical element is spatially uniform.

In an alternative embodiment, the inventive system includes an array of thermo-electric devices that are selectively turned on via a signal processor, so that a resulting heat pattern deforms the optical component into a desired shape.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
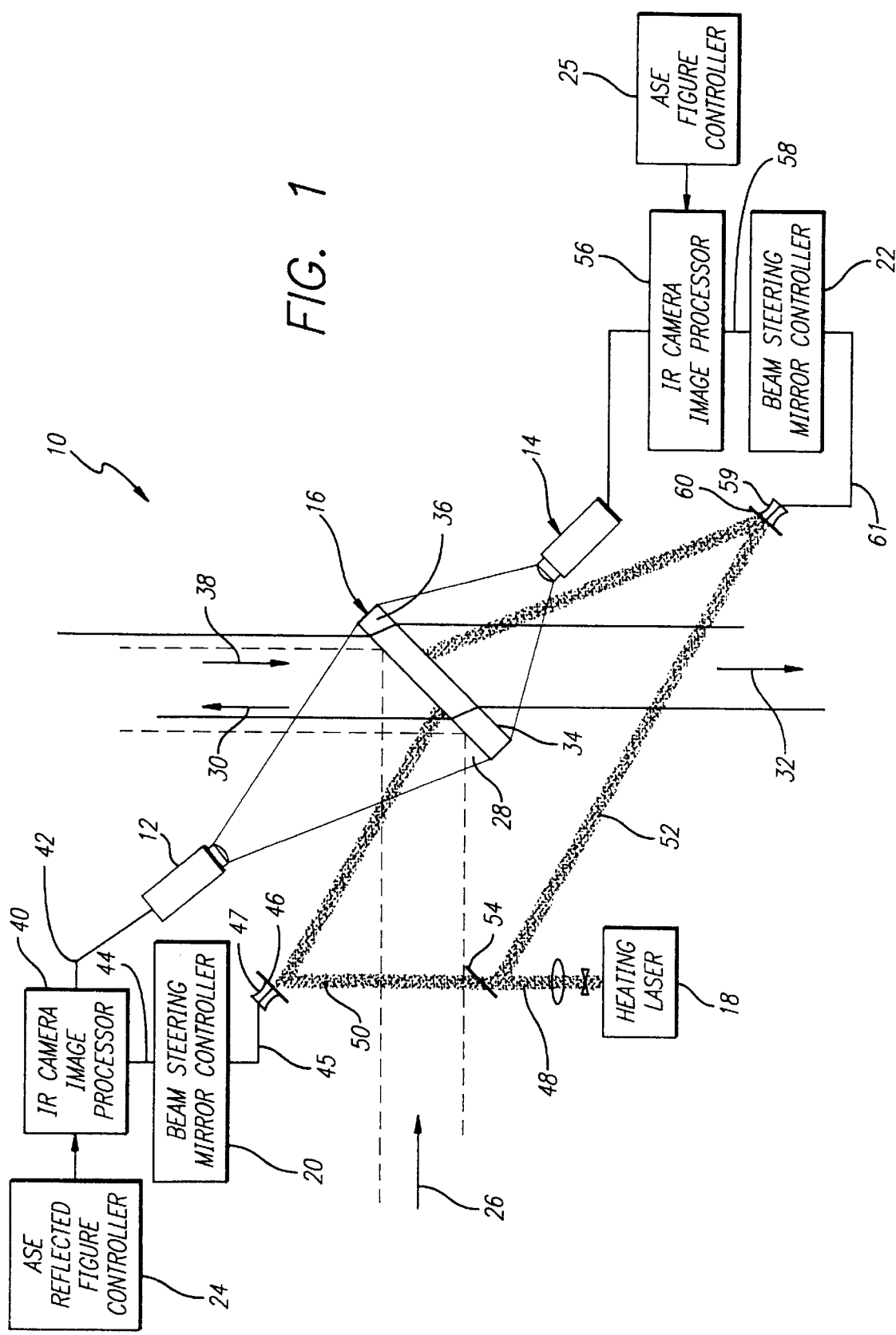
FIG. 1 is a diagram of an optical component deformation control system constructed in accordance with the teachings of the present invention utilizing infrared detectors.

FIG. 1 is a diagram of an optical component deformation control system 10 constructed in accordance with the teachings of the present invention utilizing a first infrared detector camera 12, and a second infrared detector camera 14. The system is applied to a laser system aperture sharing element (ASE) 16 and includes a heating laser 18, a first beam steering mirror controller 20, a second beam steering mirror controller 22, and a first 24 and second 25 figure controller.

A high-energy input laser beam 26 reflects off a first ASE surface 28 resulting in a reflected beam 30. A received signal beam 38 impinges on an ASE surface 28, and transmits through an ASE substrate 36 resulting in a transmitted beam 32. Typically, the input beam 26 is a very high intensity beam with an uneven beam intensity profile. Energy from the uneven beam 26 is unevenly distributed across the first ASE surface 28 resulting in uneven heating of the substrate 36 and the first surface 28. The uneven heating results in uneven surface coating and substrate temperature and expansion, altering the reflective and refractive properties of the first surface 28 and the substrate 36.

The first infrared camera 12 detects a temperature pattern (not shown) on the first surface 28 resulting from the uneven input beam 26. Information corresponding to the temperature pattern is directed to a conventional infrared camera image processor 40 via a camera bus 42. The processor 40 is connected to the figure controller 24. The controller 24 provides instructions to the processor 40 for formatting the temperature pattern information received by the image processor 40. The instructions include a closed loop control algorithm that converts temperature pattern information supplied by the camera 12 into heat pattern signals 44 that are output to the first beam steering mirror controller 20.

The image processor 40, with input from the figure controller 24, determines the heat pattern that must be applied to the first ASE surface 28 in order that the temperature across the ASE surface 24 be uniform. This heat pattern information is supplied to the beam steering mirror controller 20 via the heat pattern signals 44. The controller 20 converts the heat pattern signals 44 into actuator control signals 45. The control signals 45 are received by a mirror actuator 47 that selectively moves a beam steering mirror 46 in response to the control signals 45. Hence, the beam steering mirror 46 is selectively actuated via the first beam steering mirror controller 20 in response to the heat pattern signals 44.

The heating laser 18 provides a heating laser beam 48 that is largely absorbed by the coatings on the surfaces 28,34 of the ASE or by the ASE substrate 36 material. The beam 48 is split into a first 50 and second 52 heating beam via a conventional beam splitter 54. The first heating beam 50 is directed to the first beam steering mirror 46 where it is reflected to the first ASE surface 28. The steering mirror 46 is angled by the mirror controller 20 so that cooler areas on the surface 28 are heated by the beam 50.

The closed loop control algorithm running on the image processor 40 continually updates the heat pattern control signals 44 in response to temperature pattern information received form the first infrared camera 12. The processor 40 includes a conventional memory and an image frame comparator. The current image frame supplied by the camera 12 is compared to a previously stored image frame that is stored in the conventional memory. Differences between the previously stored image frame, and the current image frame are used to generate the heat pattern control signals 44.

In the present specific embodiment, the previously stored image frame corresponds to a frame having a uniform temperature. Those skilled in the art will appreciate that the previously stored image frame may have varying temperature profile that varies in accordance with a desired optical component shape without departing from the scope of the present invention.

Another heat pattern is applied to the back ASE surface 34 in a manner similar to that of the front surface 28. The second infrared camera 14 provides temperature pattern information about the second surface 34 to a second conventional infrared camera image processor 56. The figure controller 25 works with the second infrared camera image processor 56 to generate heat pattern signals 58.

A second beam steering mirror 60 is selectively actuated by a mirror actuator 59 and the second beam steering mirror controller 22 via the control signals 58. The second heating beam 52 is directed by the beam splitter 54 to the steering mirror 60 where the beam 52 is reflected onto the second ASE surface 34. The beam 52 is swept across the back ASE surface 34 so that a heat pattern is formed by the beam 52 on the back surface 34. The addition of the heat pattern to the second ASE surface 34 results in a uniform temperature distribution across the second ASE surface 34 that is the same as the temperature distribution across the ASE surface 28. Setting the two ASE surfaces 28, 34 to the same temperature eliminates the bulk bowing of the substrate 36 that occurs when the two surfaces 28, 34 are at different temperatures.

Use of the system 10 results in a uniform temperature distribution across the ASE surfaces 28, 34. Optical distortions caused by uneven expansion of optical surface coatings, uneven expansion of the substrate 36, changes in indices of refraction of the surface coatings and the substrate 36, and bowing of the substrate 36 are eliminated. As a result, the reflected beam 30 and the transmitted beam 38 are distortion free. By eliminating such optical distortions, the width of the input beams 26 and 32 may be drastically reduced, as well as the size of the ASE 16. A reduction in the size of the ASE 16 allows for a reduction in the size of an associated laser system (not shown), and a corresponding improvement in laser system weight, cost, and vibration control.

Those skilled in the art will appreciate that the system 10 may be applied to a variety of optical components other that a laser system ASE without departing from the scope of the present invention.

Figure 2:
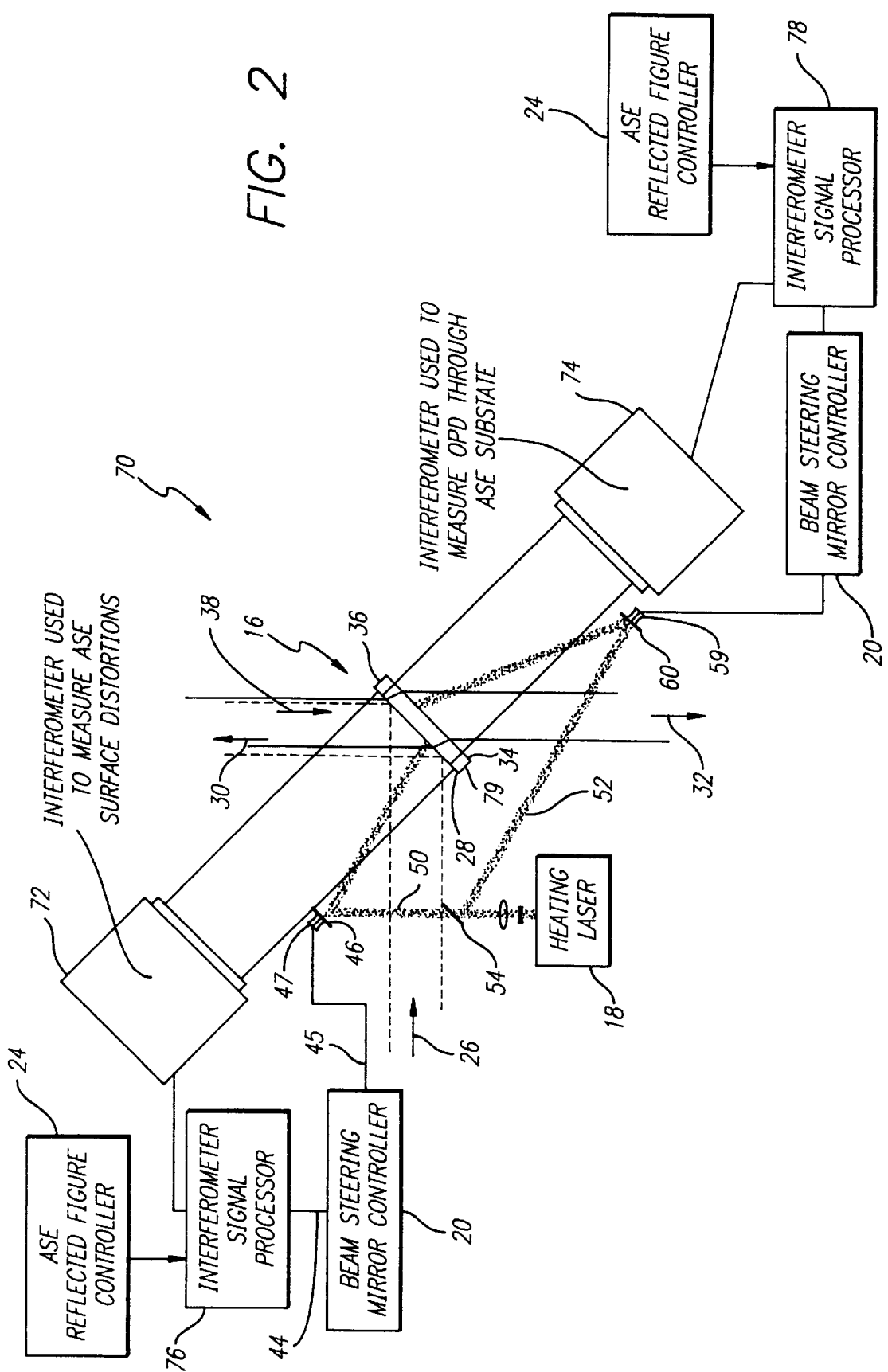
FIG. 2 is a diagram of a first alternative embodiment of the deformation control system of the present invention utilizing interferometers.

FIG. 2 is a diagram of a first alternative embodiment 70 of the deformation control system of the present invention utilizing interferometers 72, 74. The operation of the system 70 is similar to the operation of the system 10 of FIG. 1 with the exception that the infrared cameras and camera controllers are replaced by interferometers 72, 74 and interferometer signal processors 76, 78.

The first interferometer 72 measures the distortion pattern on the first ASE surface 28 rather than the temperature pattern. The distortion pattern is used by the first interferometer signal processor 76 running the control algorithm supplied by the figure controller 24 to provide the heat pattern signals 44 to the beam steering mirror controller 20. The mirror controller 20 supplies actuator control signals 45 to the actuator 47 to selectively actuate the mirror 46 to heat the surface 28 in a pattern complimentary to the distortion pattern measured by the interferometer 72.

The second interferometer 74 measures the combined distortions of two-pass transmission through the ASE 36 and reflection off the back 79 of the surface 28, which is then used to develop a complimentary heat pattern to be applied to the second ASE surface 34. The complementary pattern is extracted from the interferometer image in the second interferometer processor 78 running the algorithm supplied by the figure controller 24. The second beam steering mirror 60 is selectively actuated by the actuator 59 via information received from the beam steering mirror controller 20 that in turn receives information via the interferometer signal processor 78 and the figure controller 24. The actuator 59 controls the mirror 60, directing the heating beam 52 to selectively heat the second ASE surface 34 to eliminate undesirable changes in the reflective and refractive properties of the substrate 36 and the surface 28 coatings.

Figure 3:
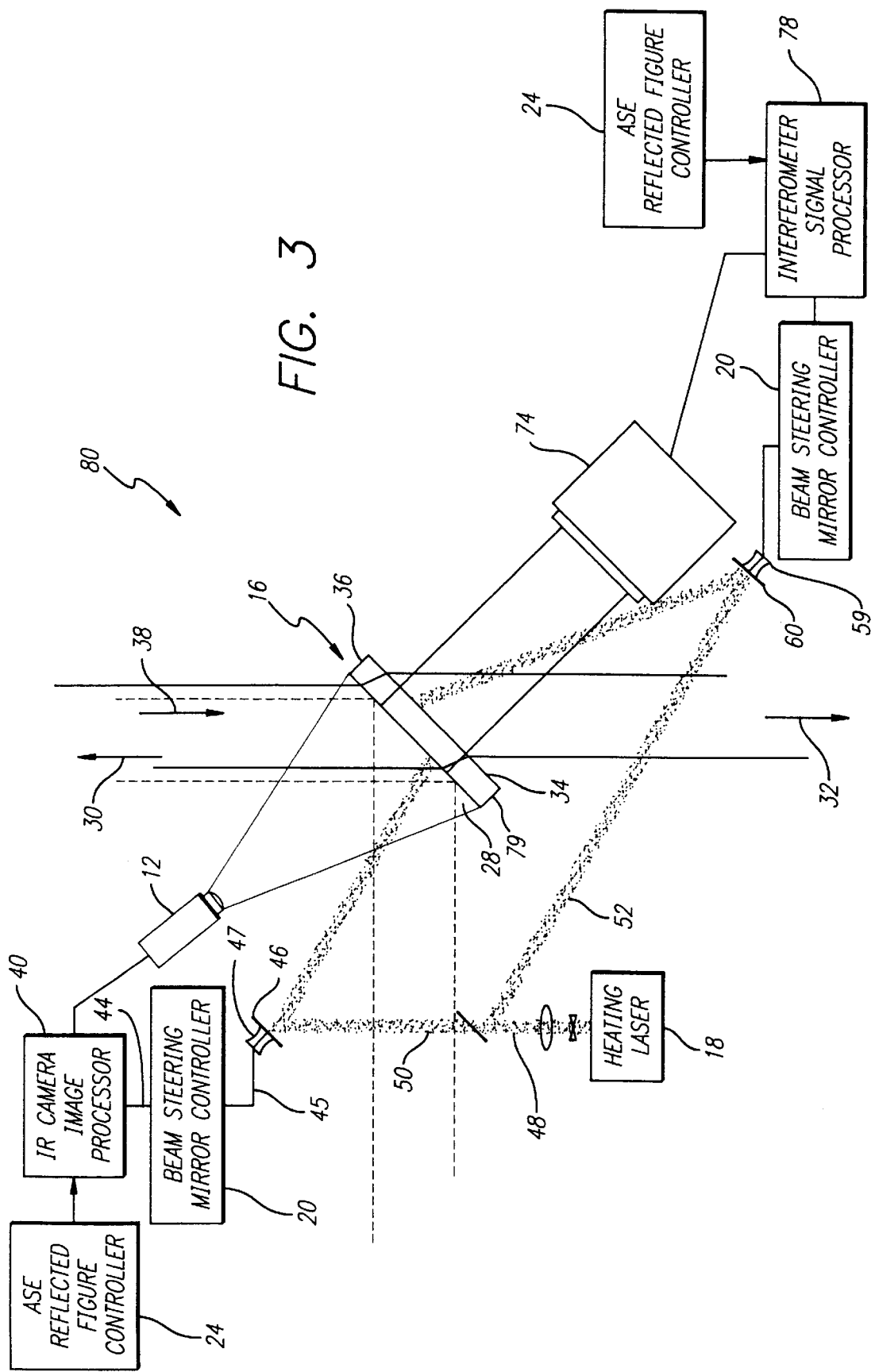
FIG. 3 is a diagram of second alternative embodiment of the present invention having an infrared detector and an interferometer.

FIG. 3 is a diagram of a second alternative embodiment of the present invention in which the deformation control system 80 includes the infrared detector camera 12 and the interferometer 74. The operation of the infrared camera 12, the camera image processor 40, the figure controller 24, the beam steering mirror controller 20, and the beam steering mirror 46 is similar to that of FIG. 1. The components 12, 40, 24, 20, 46 form a closed control loop used to determine and provide a heat pattern to the surface 28 to eliminate undesirable distortions and optical effects.

The operation of the interferometer 74, the interferometer signal processor 78, the figure controller 24, the beam steering mirror controller 20, and the second beam steering mirror 60 is similar to that of FIG. 2. The components 74, 78, 24, 20, 60 form a closed control loop used to determine and provide a heat pattern to the surface 34 to eliminate undesirable distortions and optical effects.

Figure 4:
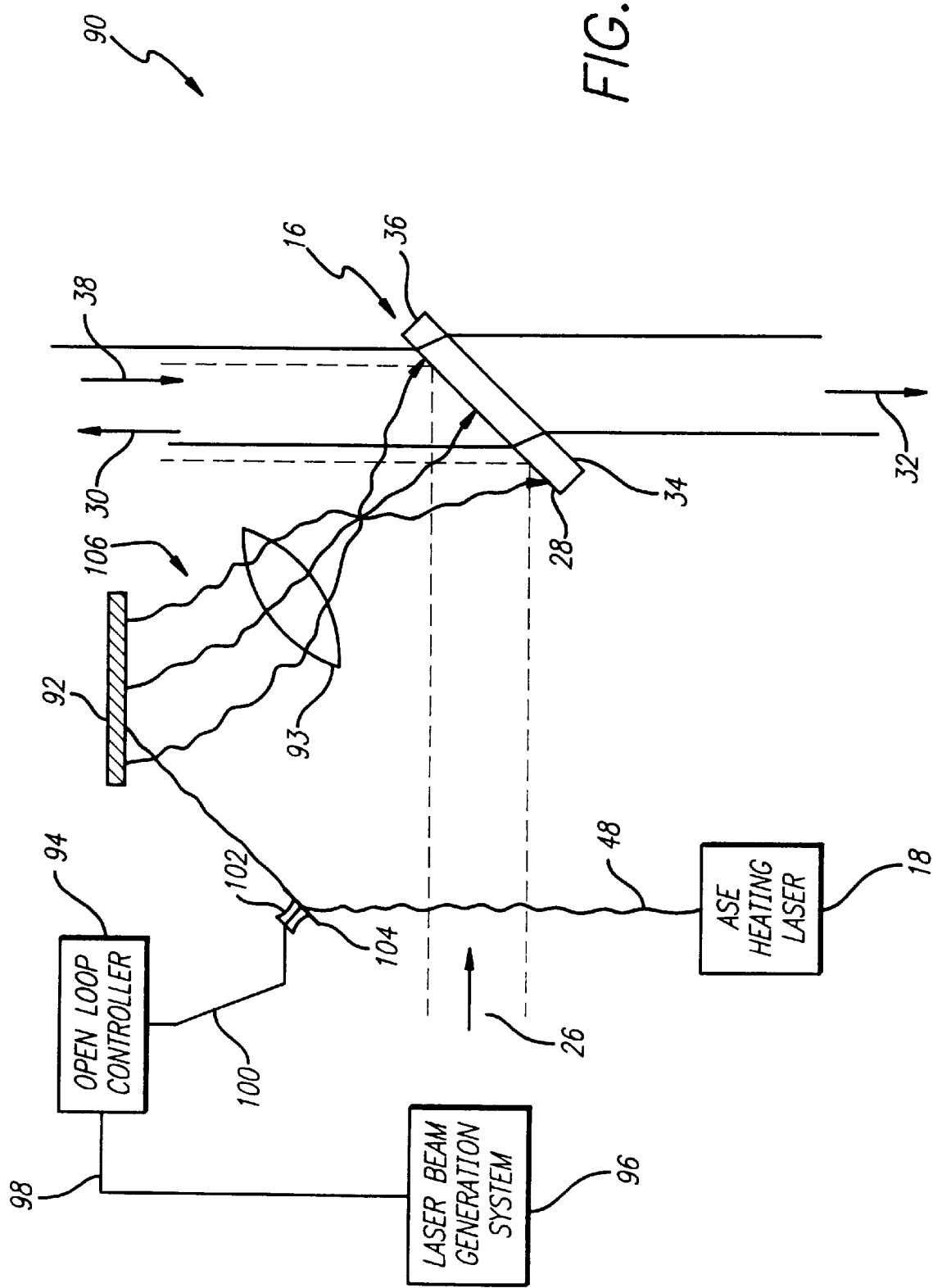
FIG. 4 is a diagram of a third alternative embodiment of the present invention having a heat map reflector and an open-loop controller.

FIG. 4 is a diagram of a third alternative embodiment 90 of the present invention having a heat map forming surface 92 and an open-loop controller 94. Information from a laser beam generation system 96 corresponding to the beam 26 irradiance pattern is supplied to the open loop controller 94 via a controller bus 98. The beam generation system 96 has an irradiance sensor (not shown) that provides this information. The open loop controller 94 utilizes the information supplied via the bus 98 to determine an appropriate heat pattern to be applied to the surface 28 to make the surface temperature uniform. The heat pattern is converted into electronic control signals 100 that control the movement of the actuator 102. The actuator 102 in turn controls the movement of a beam steering mirror 104 connected to the actuator 102.

The heating laser 18 provides the heating beam 48 which is directed to the mirror 104. The heating beam 48 reflects off the selectively actuated mirror 104 onto the heat forming surface 92 forming the desired temperature pattern on the heat map forming surface 92. Heat 106 radiates from the forming surface 92 in the desired pattern that is complimentary to the heat pattern that would be caused by the uneven beam 26 on the surface 28 without the application of the system 90. The heat 106 is imaged onto the surface 28 by the heat map imaging optics 93. The resulting complimentary heat pattern, when added to the heat pattern caused by the uneven beam 26, results in a uniform temperature pattern on the surface 28. This reduces or eliminates undesirable temperature related optical errors. The first reflected beam 30 then more closely resembles the first input beam 26.

Those skilled in the art will appreciate that a system similar to the system may be applied to the second surface 34 to reduce undesirable distortions and optical effects.

Figure 5:
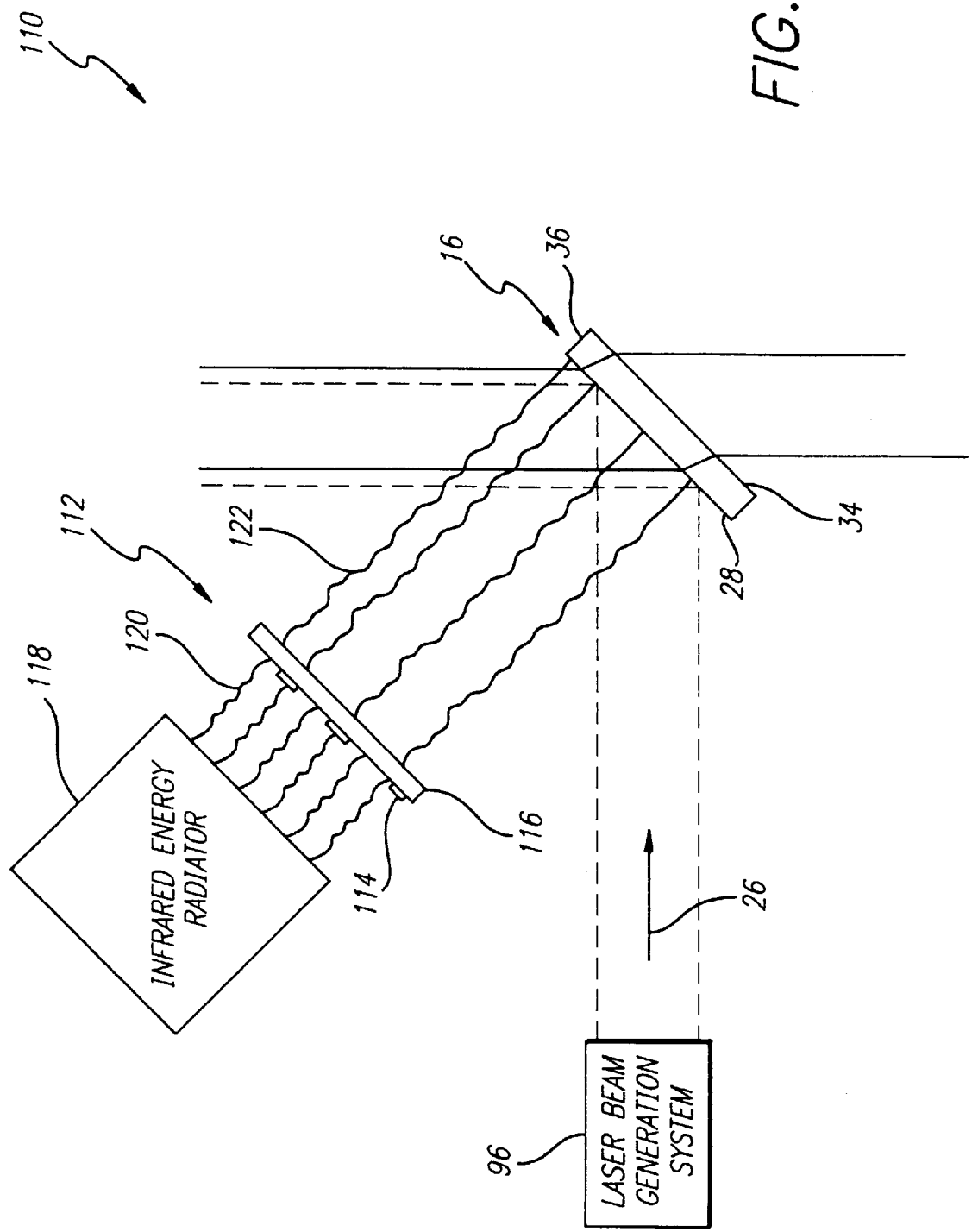
FIG. 5 is a diagram of a fourth alternative embodiment of the present invention having a predetermined heat mask.

FIG. 5 is a diagram of a fourth alternative embodiment 110 of the present invention having a predetermined heat mask 112. Previous information about the irradiance profile of the high-energy laser beam 26 obtained from the laser beam generation system 96 is used to form the heat mask 112.

The exemplary heat mask 112 is an opaque coating 114 that is applied to a transparent mask substrate 116. The coating 114 may be a metallic optical grade coating having varying degrees of thickness, and corresponding varying degrees of reflectivity. The reflectivity varies in accordance with the irradiance profile of the beam 26. This coating 114 may be deposited on the mask substrate 116 using conventional depostion methods. The coating 114 may be an electrically actuated liquid crystal heat mask without departing from the scope of the present invention.

An infrared energy radiator radiates infrared energy 120 onto the heat mask 112. Infrared energy 122 is transmitted through the heat mask 112 in pattern complimentary to the irradiance pattern of the beam 26. The transmitted infrared energy 122 is imaged onto the ASE surface 28 by imaging optics (not shown), heating cooler areas of the surface 28 so that the temperature of the surface 28 becomes uniform.

Those skilled in the art will appreciate that a system similar to the system 110 may be applied to the second surface 34 to reduce undesirable distortion and optical effects without departing from the scope of the present invention.

Figure 6:
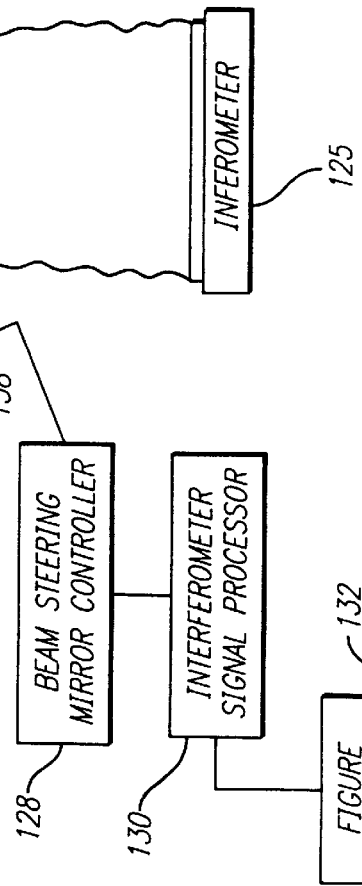
FIG. 6 is a diagram of a deformable mirror constructed in accordance with the teachings of the present invention and utilizing an interferometer.

FIG. 6 is a diagram of a deformable mirror system 123 constructed in accordance with the teachings of the present invention and utilizing an interferometer 125. The system 123 also includes a mirror 124, a heating laser 126, a beam steering mirror controller 128, an interferometer signal processor 130, and a figure controller 132.

The mirror 124 is has an optically reflective front surface 134 and a special heat expansive substrate 136. The reflective surface 134 reflects electromagnetic energy at the optical wavelength of the high power laser beam 26 but absorbs electromagnetic energy at the wavelength of the heating laser 126.

The interferometer 125 measures the mirror 124 distortion by measuring the shape of the reflective surface 134. Distortion information is sent to the interferometer signal processor 130. The figure controller 132 is connected to the signal processor 130 and provides the processor 130 with information corresponding to the desired mirror shape as input to the controller 132 by other portions of the optical system of which this deformable mirror is a part. The interferometer signal processor 130 compares the current mirror shape as supplied by the interferometer 125 with the desired mirror shape as provided by the figure controller 132. The results of this comparison are sent to the beam steering mirror controller 128, which generates the necessary control signals to drive a beam steering mirror 138. The mirror 138 directs a heating beam 139 from the heating laser 126 onto the reflective surface 134 and the substrate 136 in the desired heat pattern as communicated to the signal processor 130 via the figure controller 132. The heating continues, and the heated reflective surface 134 and the substrate 136 expand from the application of the heating beam 140 to deform the mirror into the desired shape. Hence, a closed control loop is formed that selectively deforms the mirror 124 into a desired shape.

The absence of large actuators within the mirror 124 results in a very compact deformable mirror design that has a wider range of applicability than its actuator controlled counterpart.

Those skilled in the art will appreciate that an infrared camera, and an infrared camera signal processor may be used in place of the interferometer 125 and the interferometer signal processor 130 without departing from the scope of the present invention.

Figure 7:
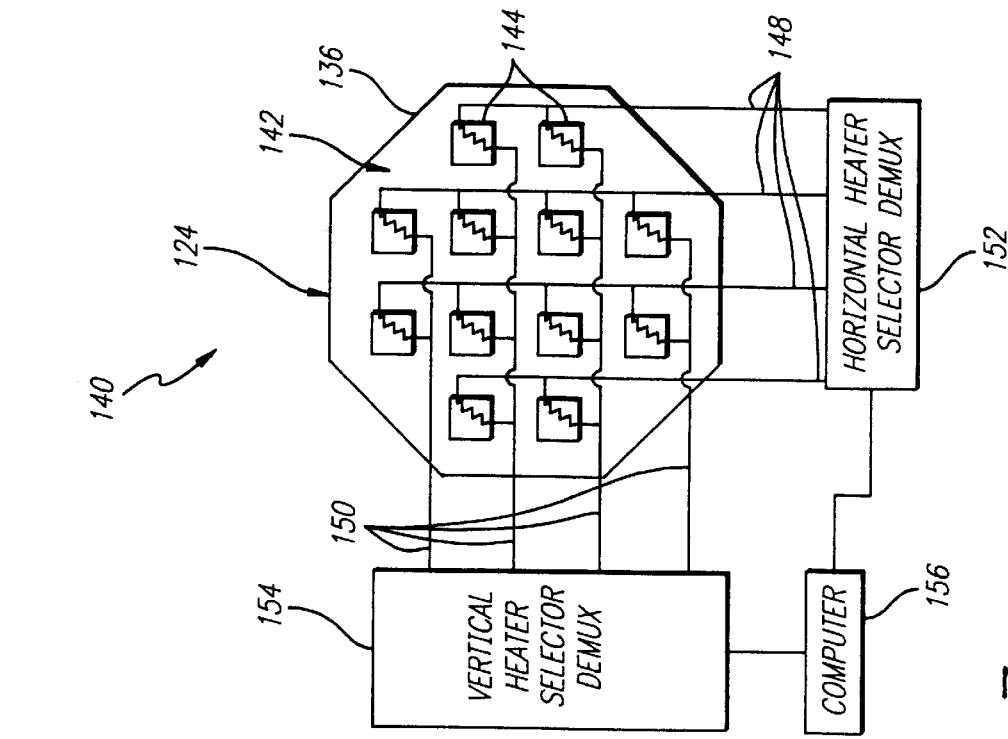
FIG. 7 is a diagram of an alternative embodiment of the deformable mirror of FIG. 6, showing a resistive temperature mapping grid constructed in accordance with the teachings of the present invention.

FIG. 7 is a diagram of an alternative embodiment 140 of the deformable mirror system 123 of FIG. 6, showing a resistive heat mapping grid 142 constructed in accordance with the teachings of the present invention. The heat mapping grid 142 is an array of electrical resistive heaters 144 that are bonded using conventional bonding techniques to the substrate 136. The heaters 144 are connected to horizontal selector inputs 148 and to vertical selector inputs 150.

The horizontal selector inputs 148 are connected to a horizontal heater selector demultiplexer (DEMUX) 152, and the vertical inputs 150 are connected to a vertical heater selector DEMUX 154. The demultiplexers 152, 154 are in turn connected to a computer 156 running mirror deformation control software. The software converts a desired mirror shape as input by other portions of the optical system of which this deformable mirror is a part into a simple two dimensional data structure such as an array.

Vertical data is assigned a voltage magnitude and is transferred serially to the vertical selector DEMUX 154. The vertical selector DEMUX 154 selectively places either a high voltage state necessary to heat the resistors 144 or a low voltage state such as zero volts on each of the vertical selector inputs 150. The states on the inputs 150 vary in accordance with information in the software data array running on the computer 156.

Similarly, horizontal data is assigned a voltage magnitude and is transferred serially to the horizontal selector DEMUX 152, where it is demultiplexed. The DEMUX 152 selectively places either a high voltage state or a low voltage state on the horizontal selector inputs 148 in accordance with horizontal information stored in the data array in the computer 156.

When one of the inputs to a particular resistor is high and the other input is low, power is delivered to the particular heater 144, and the heater is heated. Otherwise, the heater 144 remains cool. Hence, the heaters 144 are selectively turned on in a pattern corresponding to desired mirror shape stored on the computer 156 in the software data array. The heating expands the substrate 136 which in turn bends the mirror 124 into the desired shape.

Those skilled in the art will appreciate that the heaters 144 may be replaced by thermo-electric coolers (Peltier effect and/or Thomson effect), or a combination of thermo-electric coolers and resistive heaters without departing from the scope of the present invention. Those skilled in the art will also appreciate that an interferometer, or infrared detector may be included in the system to provide feedback to the computer 156 for further controlling the deformable mirror 124. Those skilled in the art will also appreciate that rather than time multiplexing a small number of shared inputs, each heater can be supplied with its own pair of inputs. In addition, the computer 156 and associated software may be implemented in hardware as a processing module.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for controlling deformations in an optical component comprising:

control means for determining a desired heat pattern; and heat pattern applicator means for applying heat to selected regions of said optical component in accordance with said heat pattern for selectively deforming said optical component, said heat pattern applicator means further comprising:

beam generation means for providing an electromagnetic energy beam; and beam scanning means for sweeping said electromagnetic energy beam in accordance with said heat pattern.

2. The invention of claim 1 wherein said optical component is a laser system aperture sharing element.

3. The invention of claim 1 wherein said control means includes an open loop controller.

4. The invention of claim 3 wherein said open loop controller includes a memory for retaining information corresponding to a desired component nature.

5. The invention of claim 4 wherein said memory includes information corresponding to an incident laser beam irradiance profile.

6. The invention of claim 1 wherein said control means includes a closed loop controller.

7. The invention of claim 6 wherein said control means further includes an interferometer for providing a first shape of said optical component.

8. The invention of claim 7 wherein said closed loop controller further includes a processor for comparing said first shape to a desired shape and calculating said heat pattern as required to deform said optical component from said first shape to said desired shape.

9. The invention of claim 6 wherein said closed loop controller includes:

an infrared energy detector for determining a current temperature pattern profile of said optical component and processor means for calculating said heat pattern as required to convert said current temperature pattern profile to a predetermined desired temperature pattern profile.

10. The invention of claim 1 wherein said beam generation means generates a beam having a wavelength that is substantially absorbed by said optical component and wherein said energy beam is swept directly across said optical component.

11. The invention of claim 1 further comprising a heat pattern forming surface, wherein said energy beam is swept across said heat pattern forming surface, and wherein said heat pattern forming surface radiates said heat pattern to said optical component.

12. A system for eliminating aperture sharing element distortion in a high power laser system comprising:

sensing means for determining said aperture sharing element distortions;

control means responsive to said sensing means for determining a heat pattern to be applied to said aperture sharing element to correct said distortion:

beam generation means for providing an electromagnetic energy beam; and beam scanning means for sweeping said electromagnetic energy beam to apply said heat pattern to eliminate said aperture sharing element distortions.

13. The system of claim 12 wherein said sensing means includes a laser interferometer system.

14. The invention of claim 12 wherein said beam generation means generates a beam having a wavelength that is substantially absorbed by said aperture sharing element and wherein said energy beam is swept directly across said aperture sharing element.

15. The invention of claim 12 further comprising a heat pattern forming surface, wherein said energy beam is swept across said heat pattern forming surface, and wherein said heat pattern forming surface radiates said heat pattern to said aperture sharing element.

16. A deformable mirror comprising:

reflection means for reflecting electromagnetic energy;

control means for determining a desired mirror shape and providing a control signal in response thereto;

beam generation means for providing an electromagnetic energy beam; and beam scanning means for sweeping said electromagnetic energy beam to apply said heat pattern for selectively providing heat gradients across said deformable mirror in response to said control signal.

17. The invention of claim 16 wherein said control means includes a closed loop controller.

18. The invention of claim 16 wherein said control means includes an open loop controller.

19. The invention of claim 16 wherein said reflection means are substantially reflective at a first wavelength and substantially absorptive at a second wavelength, and wherein said beam generation means generates a beam having said second wavelength.

* * * * *